(12) United States Patent
Shew et al.

(10) Patent No.: US 7,580,401 B2
(45) Date of Patent: Aug. 25, 2009

(54) METHOD AND APPARATUS FOR PERFORMING ROUTING OPERATIONS IN A COMMUNICATIONS NETWORK

(75) Inventors: Stephen D. Shew, Kanata (CA); Donald Penney, Kanata (CA)

(73) Assignee: Nortel Networks Limited, St. Laurent (CA)

(*) Notice: Subject to any disclaimer, the term of this patent is extended or adjusted under 35 U.S.C. 154(b) by 869 days.

(21) Appl. No.: 10/689,605

(22) Filed: Oct. 22, 2003

(65) Prior Publication Data

US 2005/0102418 A1    May 12, 2005

(51) Int. Cl.
*H04L 12/28*    (2006.01)
(52) U.S. Cl. ..................................................... 370/351
(58) Field of Classification Search .................. 370/396,
370/395, 260, 357, 401, 410, 230, 468, 218,
370/231, 236, 397, 256, 405, 331, 310, 399,
370/380, 400, 389, 229, 412, 428, 352–356,
370/465, 238, 351, 467, 335; 709/228, 238,
709/203, 217, 231–235, 226, 225, 229, 249,
709/223, 254, 351, 213, 224, 219; 398/58,
398/56; 359/118; 455/331, 435, 436, 445;
718/105; 375/222; 710/52
See application file for complete search history.

(56) References Cited

U.S. PATENT DOCUMENTS

| | | | |
|---|---|---|---|
| 5,535,195 A | 7/1996 | Lee | |
| 5,572,528 A * | 11/1996 | Shuen | 370/402 |
| 5,687,168 A | 11/1997 | Iwata | |
| 6,069,895 A * | 5/2000 | Ayandeh | 370/399 |
| 6,122,283 A | 9/2000 | Lee | |
| H1896 H | 10/2000 | Hoffpauir et al. | |
| 6,373,836 B1 * | 4/2002 | Deryugin et al. | 370/352 |
| 6,438,100 B1 * | 8/2002 | Halpern et al. | 370/218 |
| 6,640,239 B1 * | 10/2003 | Gidwani | 709/203 |
| 7,293,080 B1 * | 11/2007 | Clemm et al. | 709/223 |
| 2002/0109879 A1 * | 8/2002 | Wing So | 359/118 |
| 2002/0154606 A1 * | 10/2002 | Duncan et al. | 370/256 |
| 2002/0156914 A1 | 10/2002 | Lo et al. | |
| 2003/0043745 A1 * | 3/2003 | Kano et al. | 370/238 |

(Continued)

FOREIGN PATENT DOCUMENTS

CN    1191349    8/1998

(Continued)

OTHER PUBLICATIONS

Private Network-Network Interface Specification Version 1.1 (PNNI1.1); The ATM Forum, af-pnni-0055.002; Apr. 2002, p. 125-128,496.

(Continued)

*Primary Examiner*—Wing F Chan
*Assistant Examiner*—Prenell P Jones
(74) *Attorney, Agent, or Firm*—Jeffrey M. Measures; Borden Ladner Gervais LLP

(57) ABSTRACT

A server for use in a communications network implementing a routing function that serves multiple client NEs. The server interacts with a database storing true topology information corresponding to the client NEs. The routing function uses the true topology information in performing routing operations on behalf of the client NEs.

14 Claims, 2 Drawing Sheets

U.S. PATENT DOCUMENTS

| | | | |
|---|---|---|---|
| 2003/0078985 A1* | 4/2003 | Holbrook et al. | 709/213 |
| 2003/0105821 A1 | 6/2003 | Shah et al. | |
| 2003/0131132 A1 | 7/2003 | Cheng et al. | |
| 2003/0149791 A1 | 8/2003 | Kane et al. | |
| 2004/0132451 A1* | 7/2004 | Butehorn et al. | 455/445 |
| 2005/0089027 A1* | 4/2005 | Colton | 370/380 |
| 2006/0167985 A1* | 7/2006 | Albanese et al. | 709/203 |

FOREIGN PATENT DOCUMENTS

| | | |
|---|---|---|
| EP | 1267519 A2 | 12/2002 |
| EP | 1335627 A2 | 8/2003 |
| WO | 0215442 A1 | 2/2002 |

OTHER PUBLICATIONS

Examination Report dated Sep. 17, 2008, from European Patent Application No. 04789751.7.

ISO/IEC 10589; Information Technology-Telecommunications and information exchange between systems-Intermediate System to Intermediate System intra-domain routeing information exchange protocol for use in conjunction with the protocol for providing the connectionless-mode network service (ISO 8473); Nov. 15, 2002 (Total pages 105).

NNI Implementation Agreement for OFC 2003; The Optical Internetworking Forum; Contribution No. oif2002.476.21; Mar. 10, 2003; (Total pages 29).

IS-IS extensiions for Traffic Engineering; 'draft-ietf-isis-traffic-05.txt'; Aug. 2003; (Total pages 13).

IETF:Traffic Engineering (TE) Extensions to OSPF Version 2; RFC 3630; Sep. 2003; (Total pages 14).

IETF: IS-IS Extensions in Support of Generalized Multi-Protocol Label Switching; "draft-ietf-isis-gmpls-extensions-19.txt"; Oct. 2003; (Total pages 12).

IETF: OSPF Extensions in Support of Generalized Multi-Protocol Label Switching; "draft-ietf-ccamp-ospf-gmpls-extensions-12.txt"; Oct. 2003; (Total pages 12).

European Application No. 04789751.7: exam report dated May 19, 2009.

* cited by examiner

METHOD AND APPARATUS FOR PERFORMING ROUTING OPERATIONS IN A COMMUNICATIONS NETWORK

FIELD OF THE INVENTION

The invention relates to a routing architecture in a communications network, more particularly to a server implementing a routing function that provides routing resources to multiple client Network Elements (NE).

BACKGROUND OF THE INVENTION

Many communications networks exist that use NEs, such as packet switches with limited resources. In many instances, those NEs cannot be retrofitted with hardware/software that would offer enhanced functionality because the computing platform of the NE has no available expansion capabilities. In other instances, while a retrofit is possible, the operation may not be practical because the retrofit would incur a cost that is too high compared to the overall value of the NE.

Against this background there is a need in the industry to provide a solution to the problem of upgrading the functionality of multiple NEs in a communications network (e.g., Synchronous Optical Network (SONET) cross connect) without the necessity of performing a major and costly upgrade of the individual NEs.

SUMMARY OF THE INVENTION

In a first broad aspect, the invention provides a server for use in a communications network implementing a routing function that provides routing resources to multiple client NEs. The server interacts with a database storing true topology information about the client NEs. The routing function uses the true topology information in performing routing operations on behalf of the client NEs.

This approach increases the efficiency of the routing function in the communications network by sharing the cost of the server among multiple client NEs. Specifically, the invention can be used in instances where a communications network operator is desirous of upgrading the communications network and wishes to do so inexpensively. Examples of upgrades include the addition of a control plane to a communications network that presently does not have one or the addition of routing assist to network management functions which needs a more real time view of network resources, among others.

In a specific and non-limiting example of implementation, the server can be placed in a retrofitted NE, a totally new NE with upgraded capabilities, or a computing platform without bearer capabilities (e.g., a Personal Computer (PC)).

This novel routing architecture can be implemented in various types of communications networks without departing from the spirit of the invention. Examples of such communications network types include connection-oriented circuit switched, connection oriented packet switched, or connectionless packet switched communications networks.

In a second broad aspect, the invention provides a method for providing a routing function in a communications network. The method includes providing in the communications network a server capable of exchanging control messages with a plurality of client NEs and implementing on the server a routing function that provides routing resources to the client NEs. The routing function interacts with a database holding true topology information about the client NEs.

In a third broad aspect, the invention provides a method for upgrading a communications network having a plurality of NEs, the method comprising providing a server in the communications network and implementing on the server a routing function that provides routing resources to a plurality of NEs. In a specific and non-limiting example of implementation, the method is carried out without upgrading any one of the NEs.

In a fourth broad aspect, the invention provides a method for adding a control plane to a communications network that currently does not have a control plane. The method comprises providing a server in the communications network that can exchange control messages with a plurality of NEs of the communications network and implementing on the server a routing function that provides routing resources to the plurality of NEs.

BRIEF DESCRIPTION OF THE DRAWINGS

A detailed description of examples of implementation of the present invention is provided hereinbelow with reference to the following drawings, in which.

Figure 1:
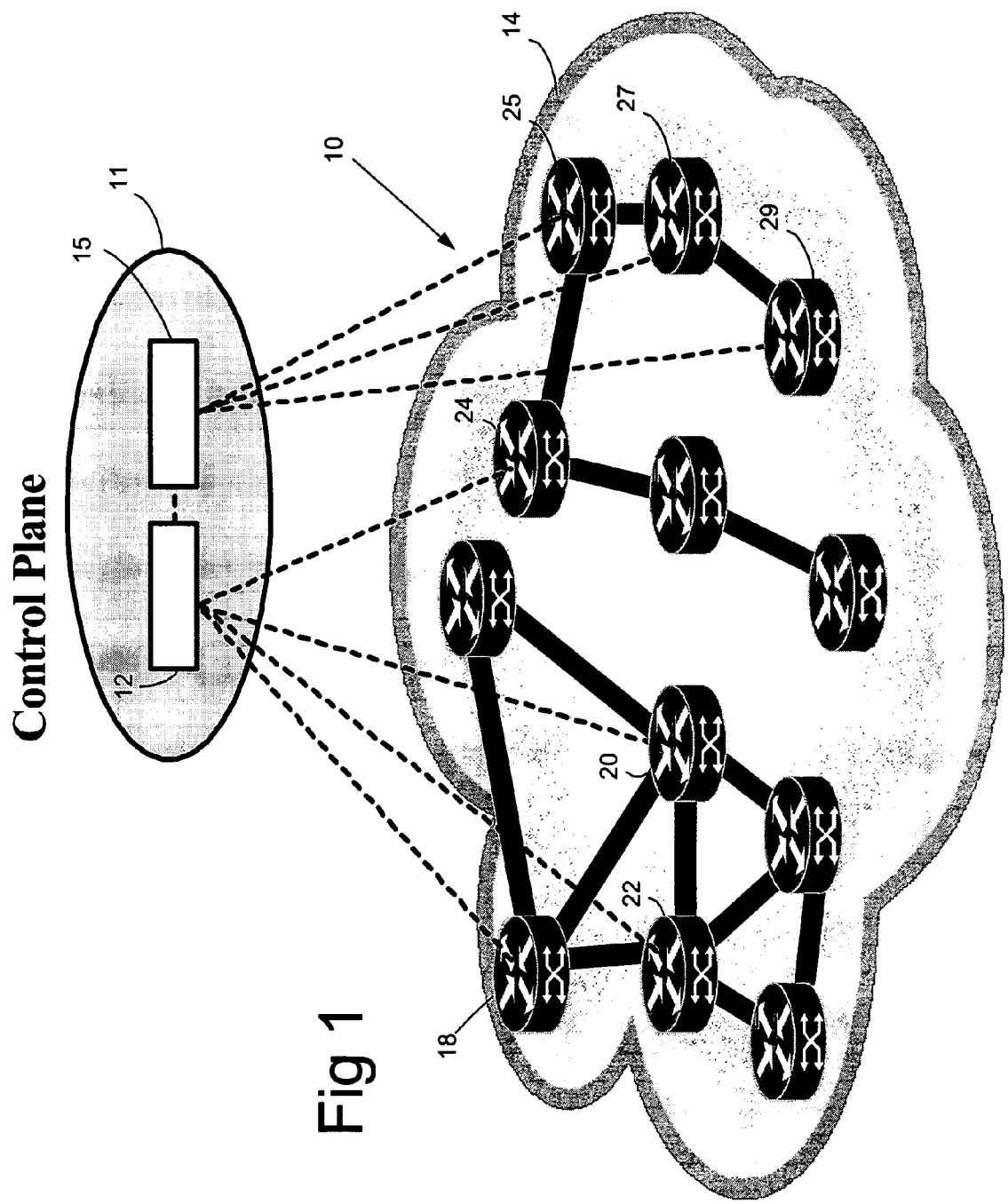
FIG. 1 is a schematical diagram of a communications network in which the present invention can be implemented.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

FIG. 1 is a high level diagram of a communications network designed to transport packetized data, in which the present invention can be implemented. The packetized data can be any type of digitally represented information, without restriction. It should be expressly noted that the following description is only an example and other types of communications networks can also be used without departing from the spirit of the invention.

The communications network 10 is a connection oriented packet switched network that includes two main components, namely a control plane 11 and a bearer plane 14. The bearer plane 14 includes a plurality of NEs, such as packet switches or SONET cross connects, interconnected by data transport connections. The data transport connections are identified in FIG. 1 by thick solid lines. The data transport connections can be wireline based or of wireless nature. Examples of wireline-based data transport connections include optical fibers and electrical conductors. The data transport connections are preferably bi-directional but unidirectional data transport connections can be used when the specific application allows it.

A control plane 11 receives requests to set-up calls, and in response to those requests the necessary control signals are sent to the appropriate NEs of the bearer plane 14 such that the data can be delivered between the source and the destination of any given call. In terms of implementation, the control plane 11 can be implemented by a single centralized entity or it can be of distributed nature. FIG. 1 shows a distributed form of implementation.

In a specific and non-limiting example, the control plane 11 is based on the Automatic Switched Optical Network (ASON) architecture and the bearer plane 14 comprises SONET/SDH cross connects.

The control plane 11 performs a routing function that provides routing resources to multiple NEs of the bearer plane 14. Specifically, the control plane 11 executes one or more instances of a routing function, where each instance of the routing function performs routing operations on behalf of multiple NEs in the bearer plane 14. For the purpose of the following description, consider the situation where the control plane function is implemented by two entities, namely a server 12 and a server 15. The servers 12, 15 communicate with NEs of the bearer plane 14 via control message or signaling connections that are separate from the data transport connections. The control message connections are shown in stippled lines in FIG. 1 to distinguish them from the data transport connections. The server 12 and the server 15 can communicate with one another via similar signaling connections. One such connection is shown in stippled lines between the boxes identifying the server 12 and the server 15, respectively.

Figure 2:
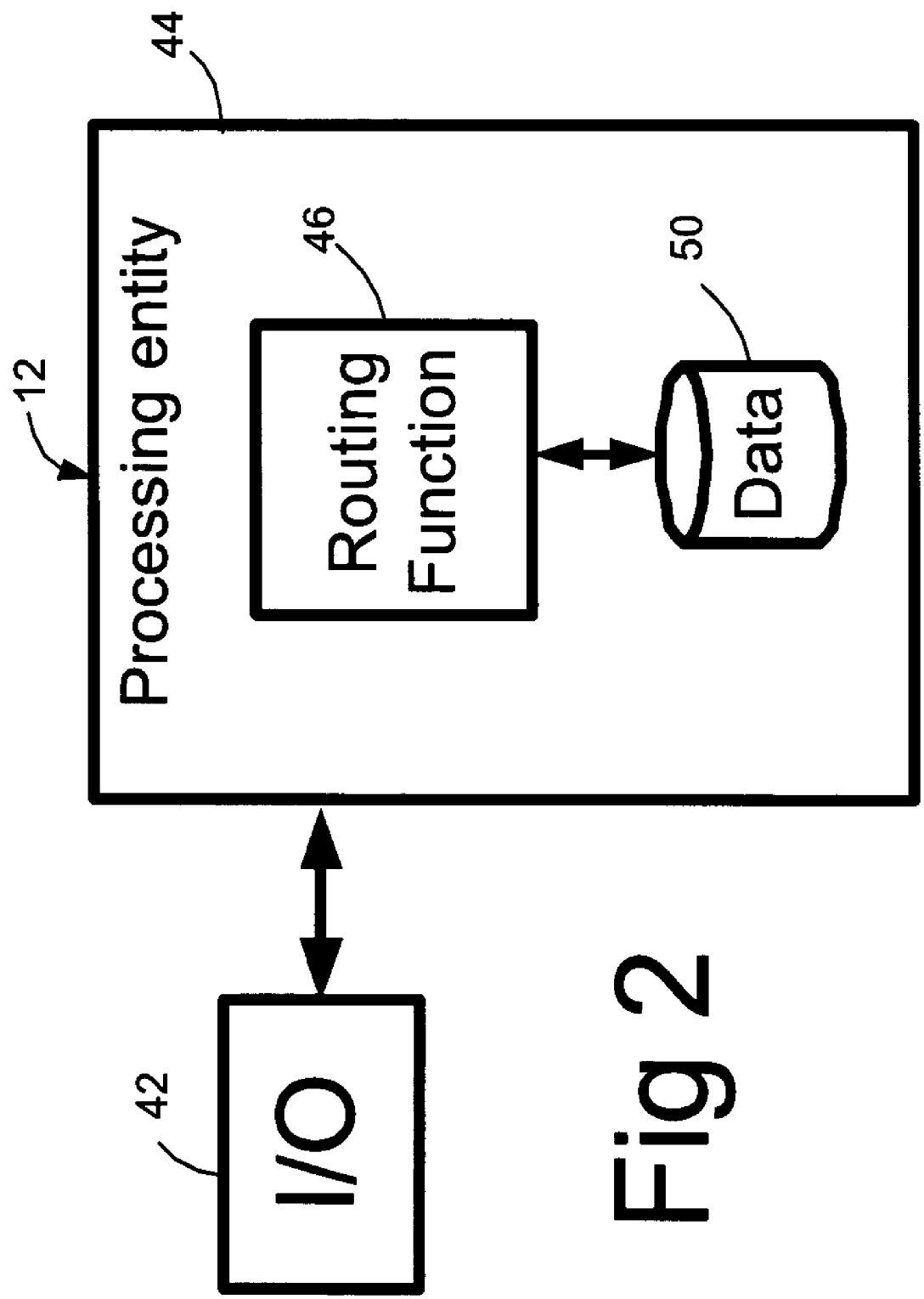
FIG. 2 is a block diagram of a server in the communications network shown at FIG. 1, that provides routing resources to multiple client NEs.

A general block diagram of the server 12 is shown at FIG. 2. The server 12 can be a PC having two main components namely an Input/Output (I/O) functional element 42 and a processing entity 44. The I/O functional element 42 designates globally the interfaces of the server 12 allowing the server 12 to exchange control messages with NEs of the bearer plane 14 and other entities that are not part of the bearer plane 14, such as peer routing instances implemented by other servers such as the server 15. The processing entity 44 designates the logic controlling the operation of the server 12. The processing entity 44, among other functions includes a routing function 46 that will be described in greater detail below.

The processing entity 44 is implemented in software. The software resides on any suitable computer readable storage medium and it is executed on any suitable computing platform. Alternatively, the processing entity 44 can be implemented partly in hardware and partly in software.

The routing function 46 executed by the server 12 performs routing operations on behalf of multiple NEs in the bearer plane 14. For example, the routing function 46 can serve NEs 18, 20, 22 and 24 that can be viewed as its clients. The routing function 46 is a single instance of any suitable routing protocol, such as Open Shortest Path First (OSPF), Intermediate System to Intermediate System (IS-IS) and Private Network to Network Interface (PNNI) that performs routing operations on behalf of the client NEs 18, 20, 22 and 24. Advantageously, the routing protocol used is a distributed routing protocol but the invention is not limited to this feature. Also, it should be expressly noted that other protocols could be used without departing from the sprit of the invention, such as protocols that are based or derived from OSPF, IS-IS and PNNI, or totally different protocols.

It should also be noted that the server 12 is not limited to a single instance of a routing protocol. The processing entity 44 can very well run multiple instances of a routing protocol, however, at least one of those instances provides routing resources to multiple client NEs in the bearer plane 14.

The routing function 46 communicates with a database 50 that contains true topology information about the client NES 18, 20, 22 and 24. True topology information is defined as information that explicitly states or allows inferring the existence of the client NEs 18, 20, 22 and 24 and associated link resources between them. "True" topology information is meant to specifically exclude arbitrary forms of representation of NEs and data transport connections between them.

In a specific and non-limiting example of implementation, the database 50 contains two types of information, namely a representation of each client NE, such as the identifier of the NE, and a representation of the link resources for each client NE. In most cases, the link resources will be currently available link resources, however it may also be envisaged to represent link resources in the bearer plane 14 that while not currently available can be potentially activated or enabled. A link resource will normally be associated with a data transport connection to/from a client NE. A single link resource will correspond to a single data transport connection when that link resource occupies the whole data transport connection. When several link resources are established over a single data transport connection, each of those link resources will be represented individually in the database and they will be associated with a common data transport connection.

While FIG. 2 shows the database 50 as being part of the server 12, it may very well be envisaged to locate the database 50 remotely from the server 12 and connect the two via any suitable connection to allow the routing function 46 to interact with the database 50.

The structure and the operation of the server 15 are identical to the server 12 with the exception that the server 15 has as clients NES 25, 27 and 29. The server also contains a database that holds true topology information about the client NEs 25, 27 and 29. Therefore, each server 12, 15 forms a separate routing instance, and speaks on behalf of the client NES in its scope. These routing instances communicate with one another via control messages determined by the routing protocol used, via suitable signaling connections between the servers 12, 15.

In the case of the server 12, since the database 50 contains true topology information about the client NEs, routing operations can be performed by the routing function 46 on behalf of those NEs. The types of routing operations include:

Learning the existence of link resources for each NE represented.

Acquiring and maintaining the state of link resources for each client NE represented. For example, the current utilization of the link or if the link goes down.

Path computation involving any one of the client NEs as a source node for the path;

Advertising the existence of each NE link (and by inference, the NE) to peer routing instances (such as the routing instance implemented by the server 15) in the communications network 10.

Receiving advertisements from other peer routing instances (such as the routing instance implemented by server 15) to form a view of the whole communications network topology.

In operation, the routing function 46 communicates with individual client NEs 18, 20, 22 and 24 in order to build and maintain the database 50 up to date. Such communications are effected via the I/O 42 and the control message connections by using any suitable control messages protocol. Various possibilities exist, all of them being in the scope of the present invention. The routing function 46 can query individual client NEs 18, 20, 22 and 24 to determine their operational status and derive information about link resources associated with each client NE 18, 20, 22 and 24. Alternatively, each client NE 18, 20, 22 and 24 can, periodically, report to the routing function 46 its operational state and its associated link resources. In the absence of such report over a period of time the routing function 46 can either issue a query to the NE 18, 20, 22 and 24 or assume the NE is down and update the database 50 accordingly.

When entities in the control plane 11 of the communications network 10 need to communicate with the routing function associated with any one of the client NEs 18, 20, 22 and 24, the control messages are sent to the routing function 46, at the server 12, instead of to the individual NEs 18, 20, 22 and 24. The routing function 46 will perform the necessary request or operation without involving the client NE 18, 20, 22 and 24.

It will be noted that the various client NEs 18, 20, 22 and 24 do not need to be contiguous or directly connected to one another by data transport connections to enable the routing function 46 to service them. This is specifically illustrated at FIG. 1, where the NE 24, which is in the scope of the server 12, is not connected by data transport connections to any one of the other NEs 18, 20 and 22 also in the scope of the server 12.

The present invention is highly advantageous when the communications network 10 is made up mostly of legacy or fairly dated equipment and it is desired to upgrade its functionality, for instance by improving or adding a routing function. A specific type of upgrade is to add a control plane to a communications network that does not have one, where the control plane would provide a routing function and maybe other functions as well. As described earlier, the method for improving the routing function includes providing in the communications network a server that will implement routing resources to multiple client NES in the bearer plane. The server can be introduced in the communications network 10 in various ways, for instance by providing a new computing platform and connecting it to the communications network or by selecting an existing NE and upgrading it with sufficient processing power and memory resources to handle the routing function. Little or no modification is required to the client NEs. Accordingly, this method of improving the routing function of the communications network 10 is advantageous because most of the hardware and software modifications are done over a single entity.

Although various embodiments have been illustrated, this was for the purpose of describing, but not limiting, the invention. Various modifications will become apparent to those skilled in the art. For example, while in the above description the control and the bearer planes of the communications network 10 are described as being separate from one another, a router instantiation is possible with a co-incidence of the control and bearer planes. This and other modifications are within the scope of this invention, which is defined more particularly by the attached claims.

The invention claimed is:

1. A method for upgrading a communications network having a plurality of NEs which are not equipped with a routing function, comprising:
   a) providing in the communications network a server;
   b) implementing on the server a single instance of a routing function for controlling routing functions for said plurality of NEs such that said plurality of NEs can perform routing functions without upgrading the NEs to include routing functions themselves.

2. A method as defined in claim 1, including implementing said routing function by running a single instance of a routing protocol.

3. A method as defined in claim 2, wherein the routing protocol is a distributed routing protocol.

4. A method as defined in claim 3, wherein said routing protocol is selected in the group consisting of OSPF, IS-IS and PNNI and a routing protocol based on either one of OSPF, IS-IS and PNNI.

5. A method as defined in claim 2, wherein the implementing of the routing function includes computing a path through the communications network for transporting data, wherein the path includes at least one of the plurality NEs as a source node for the path.

6. A method as defined in claim 2, wherein the implementing of the routing function includes advertising the existence of each of the plurality of NEs to a peer routing instance in the communications network.

7. A method as defined in claim 2, wherein the implementing of the routing function includes advertising link resources associated with each of the plurality of NEs to a peer routing instance in the communications network.

8. A method as defined in claim 2, wherein the implementing of the routing function includes receiving advertisements from a peer routing instance in the communications network about existence of NEs, other than the plurality of NEs.

9. A method as defined in claim 2, wherein the implementing of the routing function includes receiving advertisements from a peer routing instance in the communications network about link resources associated with NEs, other than the plurality of NEs.

10. A method as defined in claim 2, wherein the implementing of the routing function includes acquiring information from the client NEs about link resources associated with each client NE.

11. A method as defined in claim 1, comprising providing a database including true topology information about the plurality of NEs and allowing the routing function to interact with said database.

12. A method as defined in claim 11, comprising providing the database in the server.

13. A method for providing a control plane to a communications network that does not have a control plane, said method comprising:
   a) providing a server in the communications network that can exchange control messages with a plurality of NEs of the communications network, the NEs being part of a bearer plane of the communications network not previously controlled by a control plane;
   b) implementing on the server a routing function providing routing resources to the plurality of NEs without requiring the addition of a routing function to the NEs.

14. A method as defined in claim 13, wherein the bearer plane excludes the server.

* * * * *